(12) United States Patent
Wang

(10) Patent No.: US 8,963,002 B2
(45) Date of Patent: Feb. 24, 2015

(54) FOLDABLE AND RESTRAINABLE CABLES

(71) Applicant: James C. Wang, Las Vegas, NV (US)

(72) Inventor: James C. Wang, Las Vegas, NV (US)

(*) Notice: Subject to any disclaimer, the term of this patent is extended or adjusted under 35 U.S.C. 154(b) by 0 days.

(21) Appl. No.: 13/623,549

(22) Filed: Sep. 20, 2012

(65) Prior Publication Data

US 2013/0319760 A1  Dec. 5, 2013

Related U.S. Application Data

(60) Provisional application No. 61/653,221, filed on May 30, 2012.

(51) Int. Cl.
*H01B 7/00* (2006.01)
*H01B 7/06* (2006.01)
*H04R 1/10* (2006.01)

(52) U.S. Cl.
CPC ............ *H01B 7/06* (2013.01); *H04R 1/1033* (2013.01); *H01B 7/065* (2013.01)
USPC ........ 174/69; 174/74 R; 174/70 R; 174/84 R; 24/115 H; 24/131 C

(58) Field of Classification Search
CPC .......... H01B 7/06; H01B 7/065; B65D 63/10; H04R 1/1033
USPC ..... 174/69, 74 R, 115, 70 R, 84 R; 24/115 H, 24/131 C
See application file for complete search history.

(56) References Cited

U.S. PATENT DOCUMENTS

| | | | |
|---|---|---|---|
| 2,902,535 A * | 9/1959 | Francis | 174/69 |
| 3,246,075 A * | 4/1966 | Dansard | 174/69 |
| 4,568,401 A * | 2/1986 | Davis | 156/55 |
| 5,279,135 A | 1/1994 | Leyden et al. | |
| 5,515,580 A * | 5/1996 | McHenry, Jr. | 24/16 PB |
| 5,533,985 A | 7/1996 | Wang | |
| 5,577,932 A * | 11/1996 | Palmer | 439/501 |
| 5,622,665 A | 4/1997 | Wang | |
| 5,715,578 A | 2/1998 | Knudson | |
| 5,906,507 A | 5/1999 | Howard | |
| 6,135,992 A | 10/2000 | Wang | |
| 6,444,915 B1 | 9/2002 | Wang | |
| 6,648,024 B2 | 11/2003 | Wang | |
| 7,238,889 B2 * | 7/2007 | Rivera | 174/135 |
| 7,507,908 B1 | 3/2009 | Wu et al. | |
| 7,959,489 B2 | 6/2011 | Shaffstall | |
| 7,976,331 B1 | 7/2011 | Yang | |
| 8,399,769 B2 * | 3/2013 | Doll | 174/135 |
| 2009/0104811 A1 * | 4/2009 | Sumida | 439/501 |
| 2010/0104126 A1 | 4/2010 | Greene | |
| 2011/0031006 A1 * | 2/2011 | Chen et al. | 174/350 |
| 2011/0033727 A1 | 2/2011 | Grob et al. | |
| 2011/0252609 A1 * | 10/2011 | Rothbaum et al. | 24/306 |
| 2012/0121120 A1 | 5/2012 | Gorzelany | |
| 2012/0128193 A1 | 5/2012 | Stevinson | |
| 2012/0241195 A1 * | 9/2012 | Doll | 174/135 |

OTHER PUBLICATIONS

Wikipedia, Polytetrafluoroethylene, Jan. 16, 2010.*
Lloyd, Craig, Lifehacker.com, "The Wrap Is a Cable Organizer for your iPhone Charger", http://lifehacker.com/5929629/the-wrap-is-a-cable-organizer-for-your-iphone-charger.
Quirky.com, "Wired—Bundle Your Buds", http://www.quirky.com/products/229-Wired-ear-bud-organizers.
International Search Report and Written Opinion dated Jul. 26, 2013 from counterpart application.

* cited by examiner

*Primary Examiner* — Anatoly Vortman
*Assistant Examiner* — Jacob Crum
(74) *Attorney, Agent, or Firm* — James C. Nemmers; Shuttleworth & Ingersoll, PLC

(57) ABSTRACT

A foldable and restrainable cable for electrical and electronic devices. The cables are preformed with bends to allow the cable to be gathered together easier for bundling. The cable also has a restrainer section at one end to hold the cable together after it is gathered and bundled for storage.

33 Claims, 15 Drawing Sheets

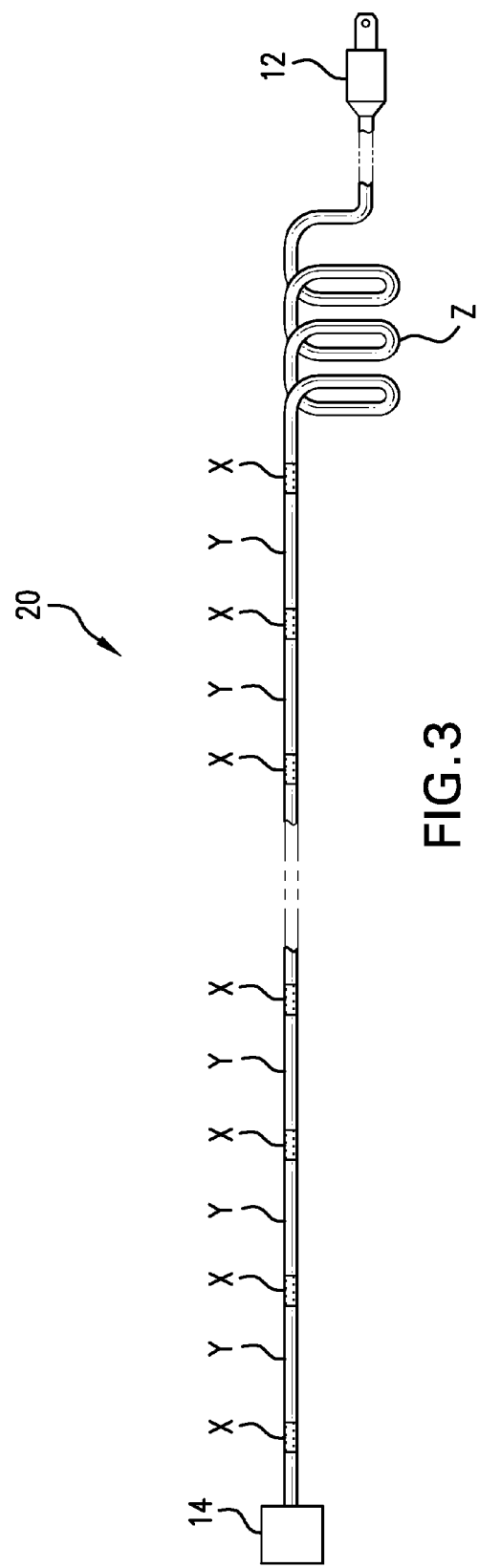

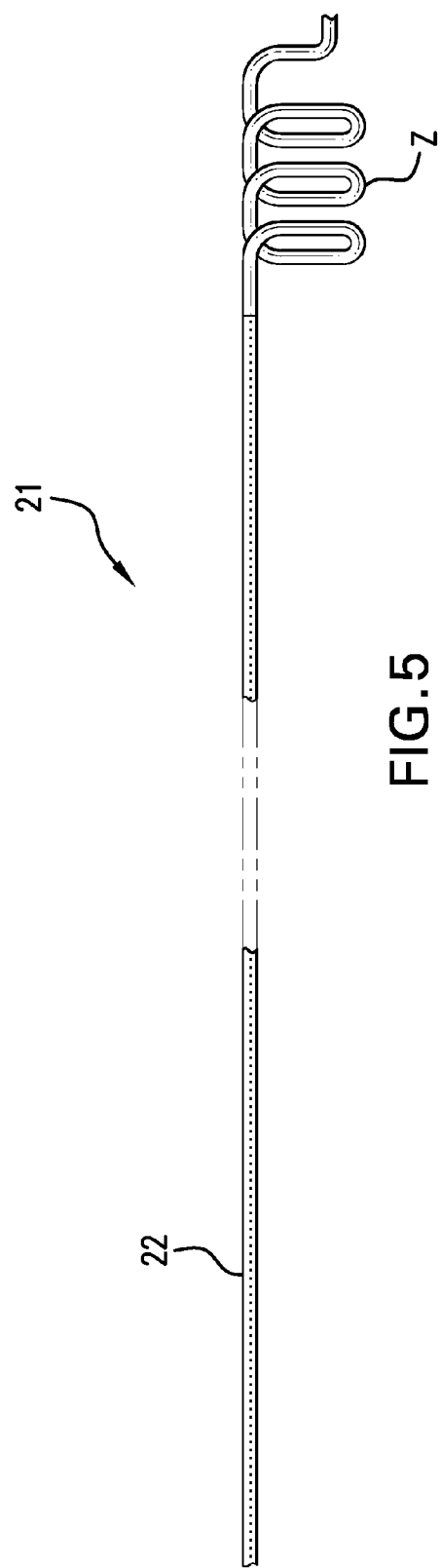

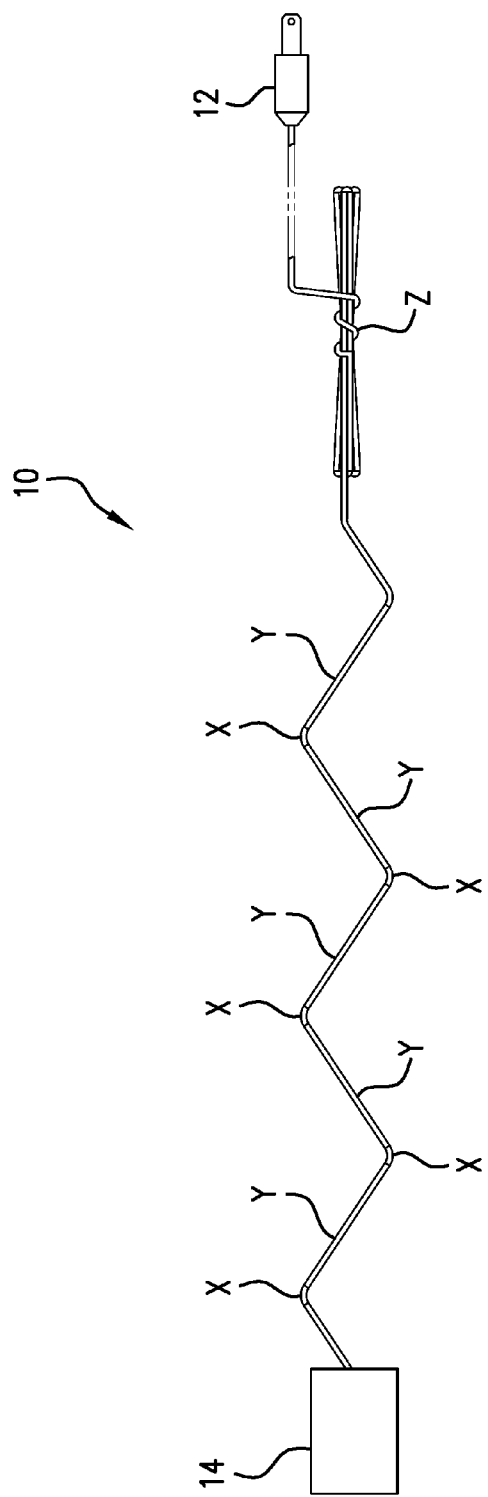

FOLDABLE AND RESTRAINABLE CABLES

This application claims priority under 35 USC 119 to Provisional Patent Application Ser. No. 61/653,221 filed on May 30, 2012, the contents of which are hereby incorporated by reference.

BACKGROUND OF THE INVENTION

The invention relates to cable assemblies for electrical and electronic devices. Cables are used for a variety of devices that do not use non-rechargeable batteries, such as electrical chargers for cell and smart phones, laptop computers and tablets of all types. Cables are also commonly used for the various components of desk top computers, land line telephones as well as for appliances and tools, such as hair dryers, hair curlers, drills, etc.

At the present time, cable assemblies such as those just mentioned, cannot be easily folded and restrained into a neat, compact arrangement when in use. The existing, unrestrained cables are messy, disorderly, and they tend to crowd the work space. When not in use and stored, usually in drawers, cables, especially those that are separable from the electrical device, tend to get in the way of other items in the same drawer and become tangled with other cables.

With the proliferation of electrical and electronic devices and the non-standardization of cable assemblies necessary for using the devices or recharging them, storage of cable assemblies has become increasingly inconvenient and unorganized. This problem is most obvious for cables for tablets and laptop computers and smart and cell phone chargers, each of which typically has a cable that is different from all others. Its not unusual to find several cables with excess lengths laying on the ground or tangled in a drawer thus creating a messy, unorganized scene and unnecessarily taking up space. These problems with existing cables becomes even worse when the need arises to bring the device and its cables with you when travelling.

Moreover, these messy unorganized cables are more than just an eye sore. It is also a child safety issue. Young children can get tangled in these cables, and they can also innocently use the cables as play things to wrap around themselves and playmates. It would be most unfortunate if a child would wrap a cable around his or her neck and create a medical emergency.

In an effort to minimize these problems when using existing cables, the user can carefully "loop" the cable together and tie it up with a twist tie or rubber band, for example. However, a suitable tie or band must be found and use of them takes much time and effort.

Some manufacturers of these cables apparently are aware of the foregoing difficulties and dangers because they are making their cable assemblies shorter and shorter in an effort to minimize these problems. For example, the cable useable for iPhone® or iPad® charging and for connecting the device to a USB port is only about three feet in length. Perhaps this shortened cable is also a way of reducing the cost of making the cables. In any event, when a cable of this type is made too short, it can be inconvenient to use with an electrical device or to charge the electrical device because the device must be positioned close to an electrical outlet.

There is therefore a need for an improved way of handling, using and storing cables for electrical and electronic devices, especially those that do not use non-rechargeable batteries.

SUMMARY OF THE INVENTION

A preferred embodiment of a cable produced according to the invention has preformed bends equally spaced apart along its length to form straight sections and a preformed restrainer section, such as a spiral tail, at one end of the cable. The cable preferably is a variable stiffness cable, with the bends and the spiral tail section made of stiffer materials so that they retain their shapes. The material for the spiral tail section can be the same material as the material used for the bends. The straight sections are made of a more flexible material so that, when in use, the cable will exhibit more flexibility and a less restrictive feel. When the need arises to bundle the cable for storage, travel, to save space or to just give a more neat and orderly appearance, the straight sections are gathered together and then wrapped around with the spiral tail section or other restraining means to hold them together.

BRIEF DESCRIPTION OF THE DRAWINGS

FIG. 3 is a view of a second embodiment of a cable made according to the invention, and showing the cable fully extended;

FIG. 4b is a simplified view of the cable of FIG. 4a;

FIG. 5 is a view of a variation of the cable of FIG. 3;

FIG. 10 is an illustration showing a cable of the invention partially pulled out and extended for use;

DETAILED DESCRIPTION OF THE EMBODIMENTS OF THE INVENTION

Figure 8A:
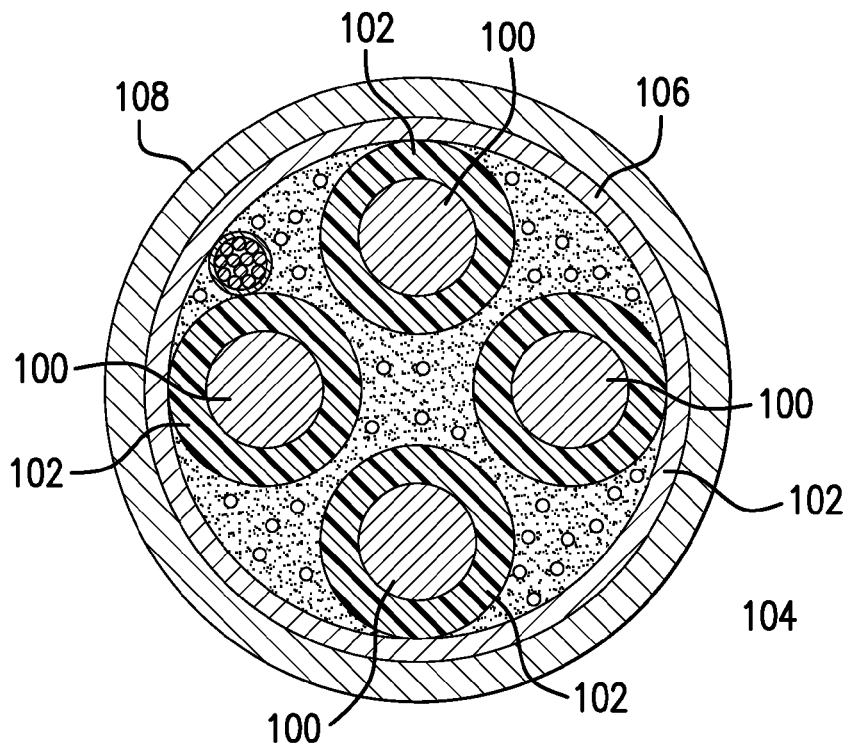
FIG. 8a is a sectional view of a multiple wire prior art cable.
Figure 8B:
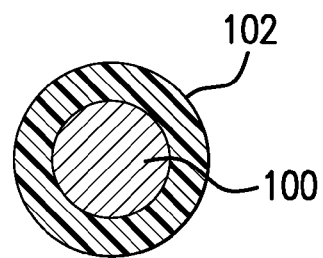
FIG. 8b is a sectional view of a single inner wire of a prior art cable.
Figure 9A:
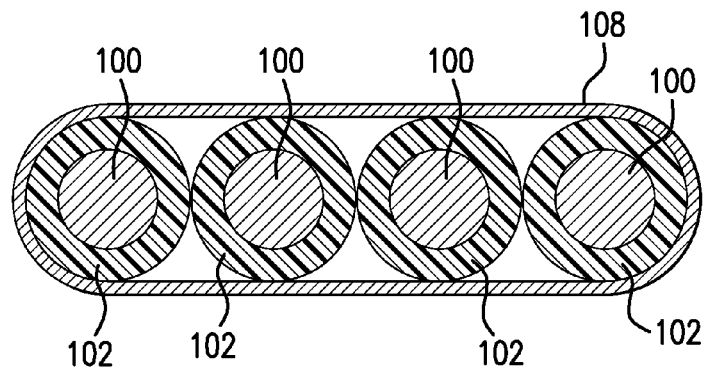
FIG. 9a is a sectional view of a flat, multiple wire prior art cable.
Figure 9B:
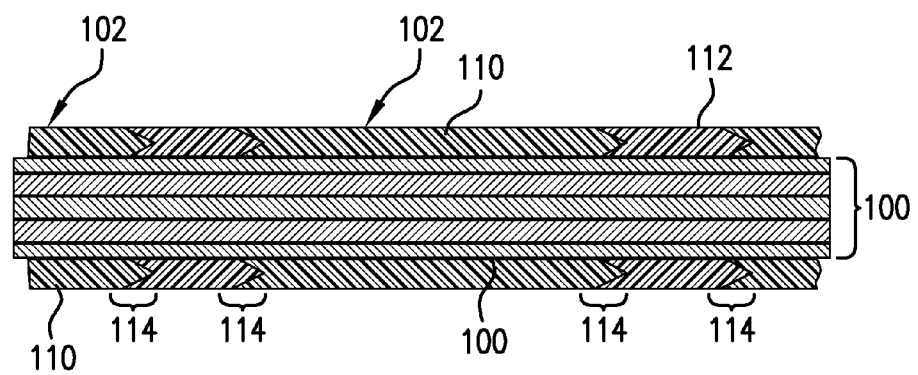
FIG. 9b is a longitudinal sectional view of a cable having a variable stiffness insulating jacket.

Cables of the general type to which the invention relates are illustrated in FIGS. 8a, 8b and 9a and 9b. Typical cables have an electrical conductor 100 that consists of one or more wires usually covered by an insulating jacket 102 made of a polymeric material. FIG. 8b shows the conductor as a single wire, but multiple wire conductors covered with a single insulating jacket are also commonly used. If multiple cables each with a conductor are used, they may be surrounded and separated by an insulating material 104, such as fibers, and then covered by a shielding layer 106 and sometimes by an outer jacket 108 (FIG. 8a). Thermoplastic polymeric materials, as well as cross-linked polymeric materials (such as natural and synthetic rubbers), are commonly used for the insulating jackets 102 of a cable.

With the exceptions described hereinafter, the principles of the invention are illustrated in connection with variable stiffness cables of the type shown and described in my U.S. Pat. No. 6,444,915, which is incorporated herein by reference. The general concept of "variable-stiffness" products is also described in my U.S. Pat. Nos. 5,533,985, 5,622,665, 6,135, 992, and 6,648,024. The invention will be described as applied to a single electrical conductor 100 of the type shown in FIG. 8b. A cable of this general type having an insulating jacket of variable stiffness is shown and described in the my '915 patent, and shown in FIG. 9b of this application. As shown, the conductor 100 (multiple wires) is covered by an insulating jacket 102 that is comprised of axially alternating annular stiff sections 110 and annular flexible sections 112 with a unique transition section 114 between stiff sections 110 and flexible sections 112. The transition section 114 gradually merges the stiff sections 110 and flexible sections 112 to eliminate any buckling and kinking that might otherwise occur between sections of different stiffness. The length of each of the sections 110, 112 and 114 depends upon the particular purpose for which the cable will be used. Also, the conductor may have an insulating jacket 102 with an inner insulating jacket (not shown) of non-variable stiffness. When used in this disclosure, the term "variable stiffness cable" refers to a cable of the type described in my '915 patent with variable-stiffness characteristics in its outer insulating jacket. If an inner jacket is also used in a particular cable, the inner jacket would be a regular, non-variable-stiffness jacket. As used throughout this application, "preforming" refers to the heating of a cable to a "preforming temperature," forming the cable into desired shapes along its length, and then cooling the cable to room temperature to retain the desired shapes. The preforming temperature depends upon the material used in the inner and outer jackets of the cable, and the temperature should be above the glass-transition-point of the outer jacket material of the cable so that the outer jacket becomes soft enough for forming. The forming temperature is also preferred to be below the melting points of the inner jacket materials of the inner wires, so that the integrity of the inner wires will not be compromised. Occasionally, the heating time required may be too long. In such an instance, temperatures higher than ideal may have to be used, and if so, controlling heating time is crucial to prevent damage of the inner wire integrity. When a higher than normal preforming temperature has to be used or if the inner wire integrity is a concern, shortening the heating time should be done. In any event, it is desirable for the inner jacket material to have a melting point that is high enough to prevent compromising the inner wire integrity. Suitable preforming temperatures and heating times should be determined by experimentation, especially if the outer jacket material is not a single material, but is a blend, such as plasticized polyvinyl chloride.

The cables to which the invention relates are commonly made by an extrusion process. Although preforming can be done off-line from the extrusion process, it can also be done in-line during the extrusion process.

The principles of the invention can potentially cover a wide range of applications, and therefore, there is disclosed herein several different embodiments, one or more of which can be used in most known applications.

Figure 1:
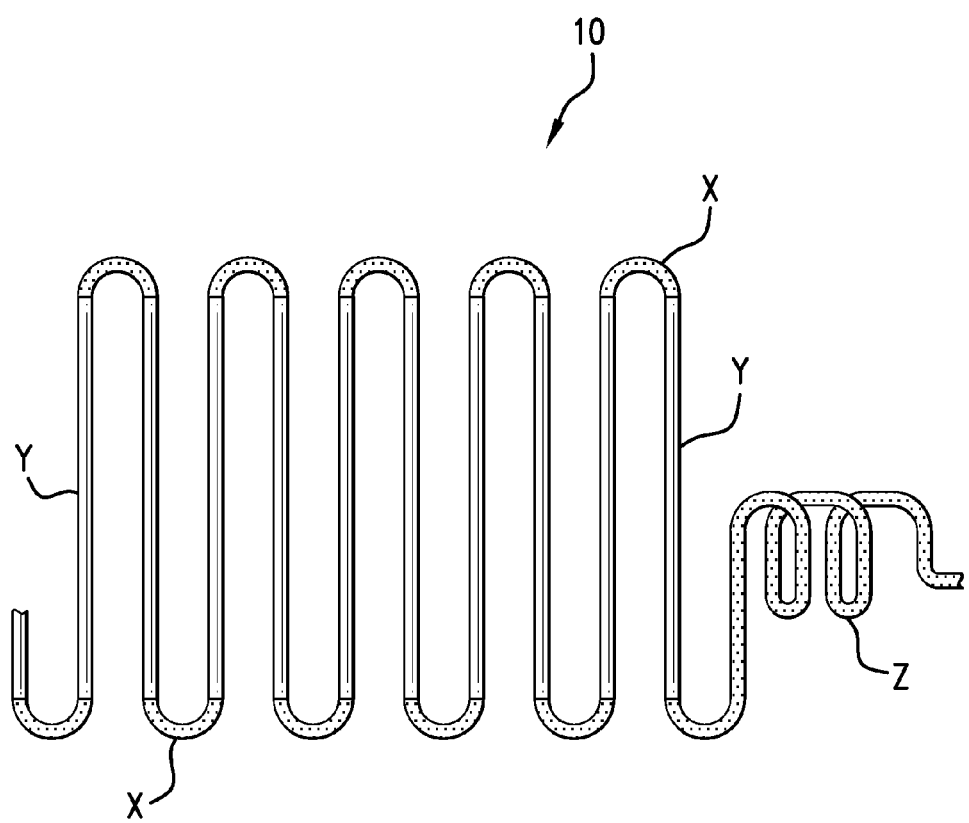
FIG. 1 is a view of a first embodiment of a cable made according to the principles of the invention.

Referring to the first embodiment of the invention illustrated in FIG. 1 and FIGS. 2a-2d, the cable 10 illustrated is a variable stiffness cable of the type referred to above. A cable produced according to the foregoing performing process results in the cable arrangement shown in FIG. 1. As shown in FIG. 1, this novel cable arrangement has preformed bends X (the dotted areas in FIG. 1) evenly spaced apart along its length to form straight sections Y and a preformed spiral tail section Z (the dotted area in FIG. 1) at one end. Although the drawing figures show a spiral tail Z of multiple loops, a single loop will be adequate in some applications. As used herein, "preformed spiral" refers to a spiral of one or more loops. Since the cable 10 is a variable stiffness cable, the bends X and the spiral tail section Z are made of stiffer materials (higher durometer values) so that they retain their shapes, and also so that the spiral tail Z will have a higher force for "restraining" action. The material for the spiral tail section Z can be the same material as the material used for the bends X. The straight sections Y are made of a more flexible material (lower durometer value) so that, when in use, the cable 10 will exhibit more flexibility and a less restrictive feel.

Figure 2A:
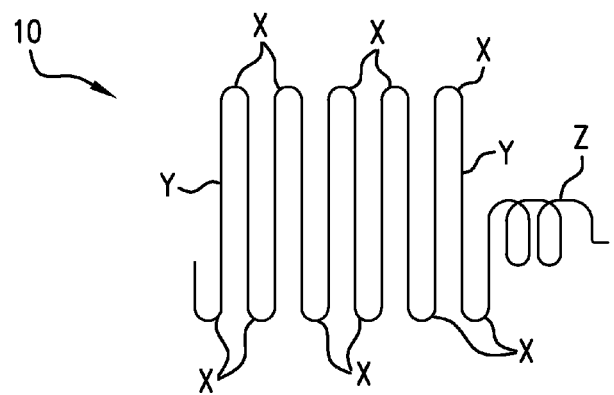
FIG. 2a is a simplified view of the cable of shown in FIG. 1.
Figure 2B:
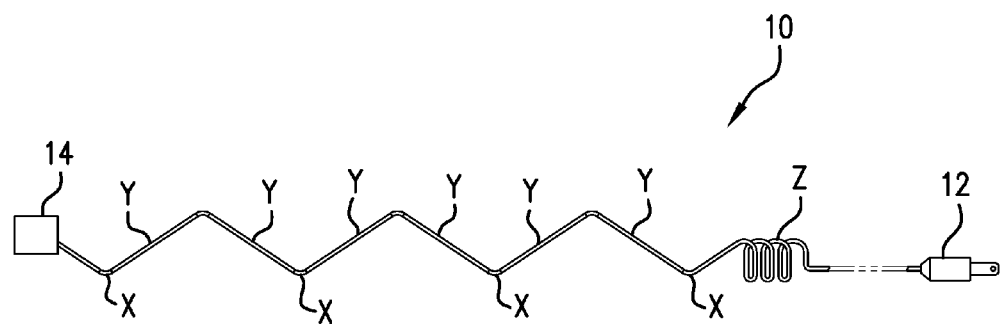
FIG. 2b is a view of the cable of FIG. 1 showing the cable extended for use.
Figure 2C:
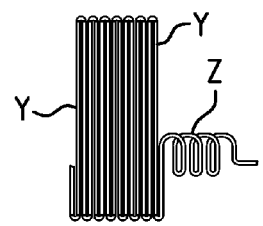
FIG. 2c is a view of the cable of FIG. 1 showing the straight sections pushed together.
Figure 2D:
FIG. 2d is a view of the cable of FIG. 1 showing the cable bundled using the spiral tail.

To illustrate the use of the cable 10 of the first embodiment of FIG. 1, FIG. 2a shows a simplified sketch of FIG. 1 with the cable 10 in a collapsed or almost completely folded condition. FIG. 2b shows the cable 10 extended when in use with a connector 12 on the spiral end. When the need arises to bundle the cable 10, the straight sections Y are gathered together as shown in FIG. 2c, then wrapped around with the spiral tail section Z as shown in FIG. 2d. As indicated earlier, the reasons for bundling the cable are for storage, travel, to save space or to just give a more neat and orderly appearance. When using a cable made according to the principles of the invention, bundling of the cable requires less than 10 seconds of time and little effort, and taking the bundle apart for usage requires even less time, 2 seconds or less.

Thus, the first embodiment of the invention provides a greatly improved cable arrangement. The bends X are preformed so that they can positively guide the folding of the cable 10. The integral spiral tail section Z provides an elegant and simple way to restrain the cable 10 after gathering of the straight sections Y and bundling them together.

A significant and important option for the foregoing described first embodiment of FIG. 1 (as well as most of the versions subsequently described) is to use a variable-stiffness cable that has a low-friction surface. This makes it easier to take the bundled cable apart for usage. It also offers a choice to partially pull out the cable or to adjust the length of the cable for specific requirements. It is preferred that the coefficient of friction of the cable surface, measured against the same material, should be lower than 0.3, and preferably lower than 0.21. There are several ways to obtain a low-friction surface on the cable. First, a low-friction material can be used in the manufacture of the cable. Several polymeric materials, HDPE (high-density polyethylene), Nylon 6, FEP (fluorinated ethylene propylene) and PTFE (polytetrafluoroethylene, such as Teflon®) have an inherently low-friction surface. Also, a low-friction coating can be applied to the outer surface of the cable. Other ways of achieving a low-friction surface on the cable is to use a "slip agent" in the outer jacket material, or to use a "co-extrusion" technique to put a layer of low-friction material on the cable surface.

With cables made according to the invention with a spiral tail section and a low-friction-surface, another significant advantage is achieved over prior art cables. When using the cable, the user can pull out just enough length of the cable 10 from the bundle for the particular need, as illustrated in FIG. 10, which shows the desired connectors 12 and 14 at both ends of the cable 10. In doing so, excess cable length is eliminated, and the "messy cable syndrome" is greatly reduced. While making the cable of the invention more useful and more attractive in appearance, having a preformed cable capable of being fully or partially pulled out depending upon the use, reduces the temptation for a child to use the cable as a rope since the cable never has the appearance of a rope. This is a definite and important safety feature.

Figure 4A:
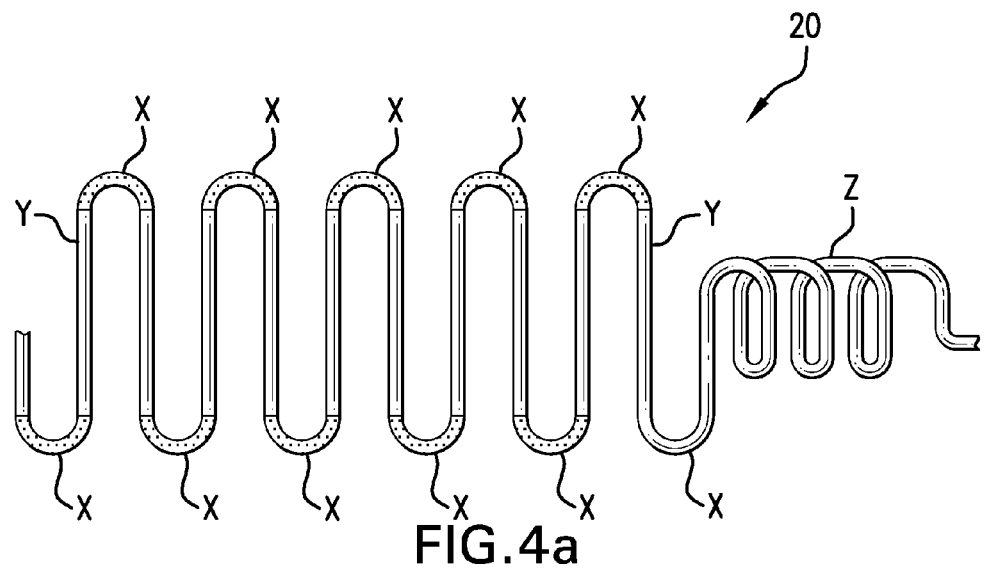
FIG. 4a is a view of the cable of FIG. 3 showing the cable folded.
Figure 4B:
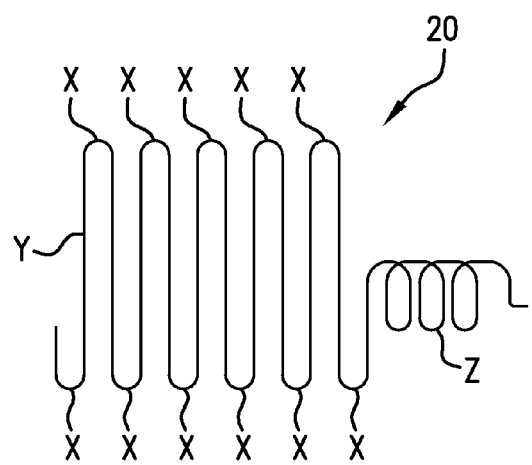
Figure 4C:
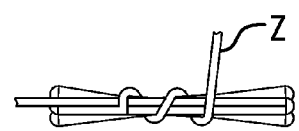
FIG. 4c is a view of the cable of FIG. 4a showing the cable bundled using the spiral tail.

Referring now to FIGS. 3, 4a, 4b, and 4c, another embodiment of the invention is illustrated, which is also a variable-stiffness cable. In this embodiment, only the spiral tail section Z of cable 20 is preformed and the bend sections X are not preformed. The straight sections Y are spaced apart by the bend sections X and are of a stiffer material than the bend sections X which are of a more flexible material. This is exactly the reverse of the structure of the cable 10 of the embodiment of FIG. 1. In this second embodiment, the bend sections X need to be softer, and as shown in FIG. 4a, in flipping action, the cable 20 bends naturally at the more flexible bend sections X between the straight sections Y. FIG. 3 shows the cable in a use condition when the cable is fully extended and without the preformed "crooked" bends of the first embodiment of FIG. 1. FIGS. 4a and 4b illustrate that the stiff straight sections Y of the cable are deliberately flipped back and forth to form a "bunch," by the stiffness of the straight sections Y. FIG. 4c shows the bunch is restrained by the spiral tail section Z to make a bundle. The option of using a cable having a low-friction surface is not essential but is also important for this embodiment.

The primary advantage of the embodiment of FIGS. 3, 4a, 4b and 4c is that, when in use, the cable can be extended fully and without the crooked bends, as shown in FIG. 3. This can be important in certain applications, but the drawback of this second embodiment is that it does not fold quite as easily as the first embodiment, but still much more easily than the cumbersome prior art cables.

There is another option for the different embodiments of the invention. The term "color differential" means to produce the stiff and flexible sections of a variable-stiffness cable with different colors. This is best achieved in the cable jacketing process (Interrupted Layer Co-extrusion process, or ILC, as described in my previous patents), by using resins of different colors. The option of using "color differential" is more important for the embodiment of FIG. 3, because, without preformed bends, the "color differential" offers a much needed visual aid for folding the cable.

FIG. 5 shows a special option of the second embodiment of FIG. 3. As shown, the cable 21 is made of only two sections. Most of the length of the cable 21, the main body 22, is made of the more flexible material, while the spiral tail section Z only is made of the stiffer material. This allows for the main body 22 to be gathered together in a random fashion and then restrained by the preformed spiral section Z.

Figure 6:
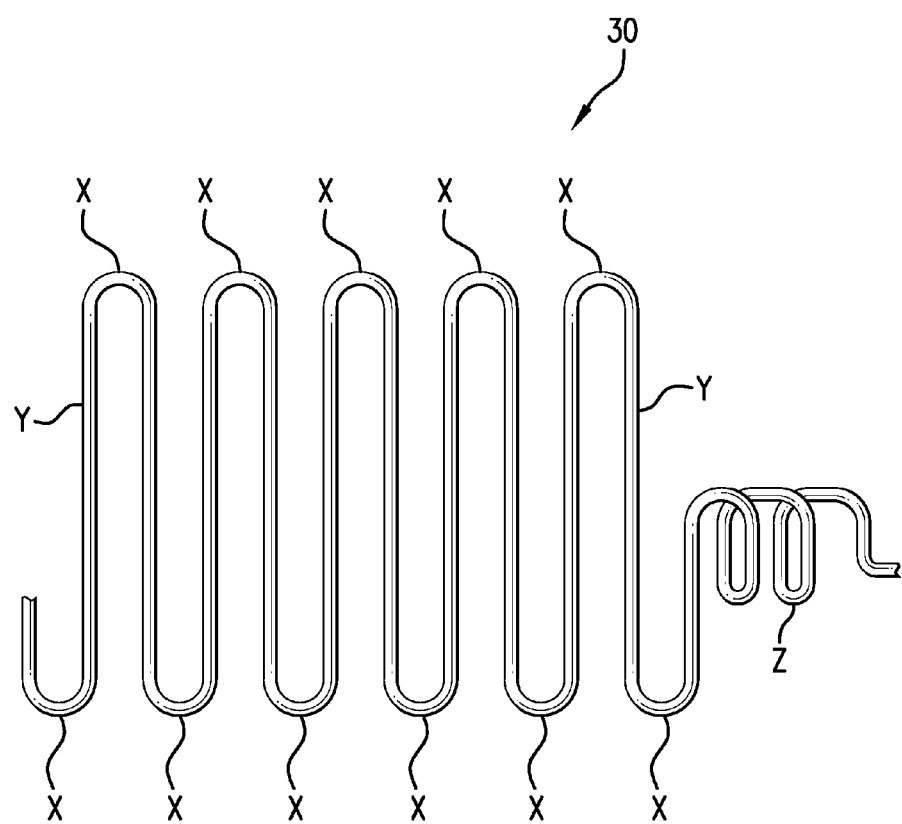
FIG. 6 is a view of a third embodiment of a cable made according to the principles of the invention.
Figure 6A:
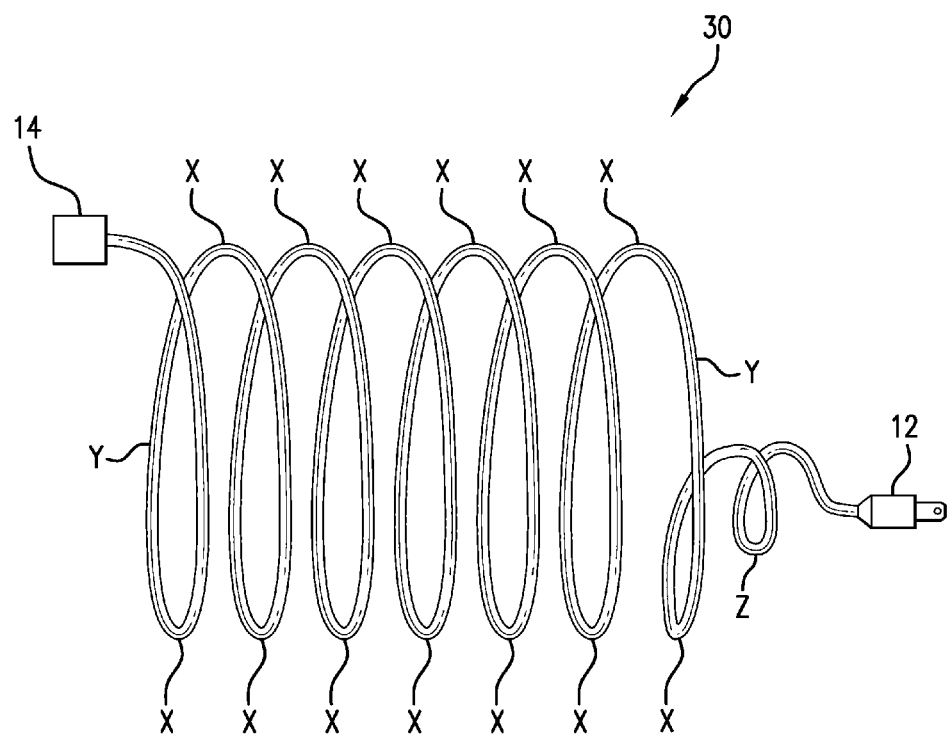
FIG. 6A is a view of a variation of the cable of FIG. 6.
Figure 7:
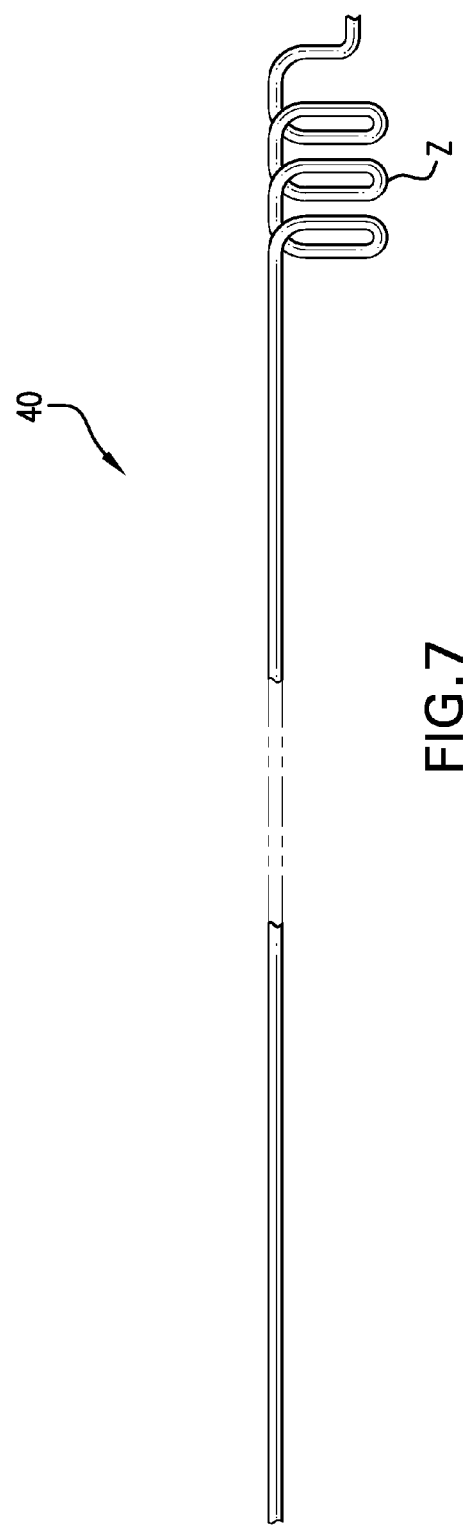
FIG. 7 is a view showing a variation of the cable of FIG. 6.

Yet another embodiment of the invention is shown in FIGS. 6, 6A and 7. This embodiment uses a cable 30 without the variable-stiffness feature. However, the cable 30 is heated and preformed as previously described into the shape shown in FIG. 6, which shape is substantially the same as that in the embodiment of FIG. 1. Or, as shown in FIG. 6A, the shape of the cable can be preformed into large loops of about the same size rather than U-shaped bends. In either event, since the cable 30 is not a variable-stiffness cable, the cable material has to be stiff enough to retain the shapes of the loops or bends X and the preformed spiral tail Z. The cable also has to be stiff enough so the cable can be easily gathered or bundled, and then held together by the spiral tail. The cable also has to be flexible enough so that the user will not feel excessive restriction when the cable is extended in use. This material compromise can be satisfactory for some applications, although not for all applications. The main advantage of the cable 30 of the embodiments of FIG. 6 and FIG. 6A is its lower cost. Having a low-friction surface is also an important option for cable 30. FIG. 7 shows a cable 40 which is a variation of cable 30, but cable 40 has no preformed bends or loops except for the spiral tail Z.

Figure 12A:
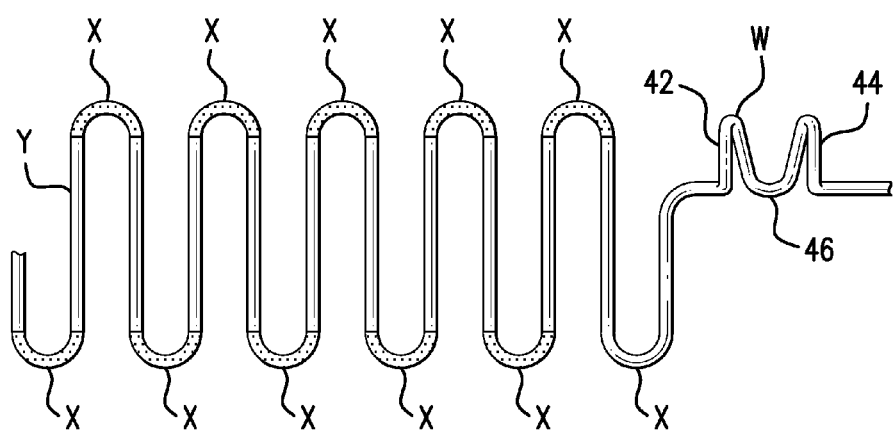
FIG. 12a is a view of yet another embodiment of the invention showing a preformed hook as a restrainer for a cable.
Figure 12B:
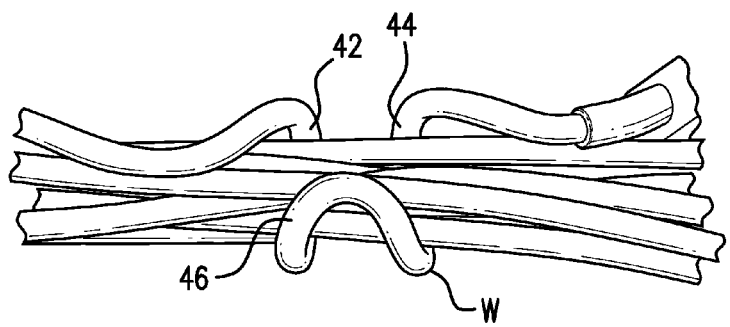
FIG. 12b is a view of the cable of FIG. 12b showing the cable folded and held together by the hook.

Turning now to FIGS. 12a and 12b, there is illustrated another version of a preformed restrainer for use on any of the cables 10, 20, 30 or 40. In this embodiment, the preformed spiral tail is replaced by a preformed restrainer W. Restrainer W is formed from two loops 42 and 44 which are in approximately parallel planes joined by a third loop 46 in a plane generally perpendicular to the planes of the loops 42 and 44 to form a somewhat "W" shape. The restrainer W provides a hook that can be used to hold the bundled portions of the cable as shown in FIG. 12b.

Figure 13:
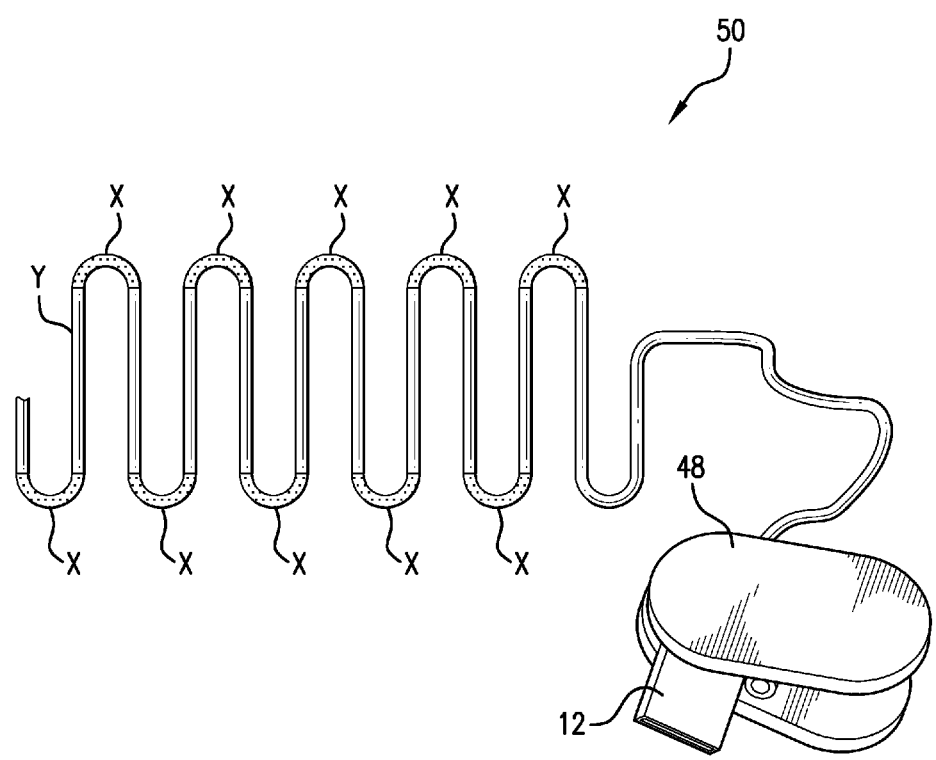
FIG. 13 is a view of yet another embodiment of the invention showing a dual function restrainer for a variable stiffness cable.

In FIG. 13, there is illustrated another option for restraining a bundled cable of any of the types described herein. Instead of a preformed restrainer such as spiral tail Z or hook W, one end of the cable is provided with a clip 48 of any suitable type that can be opened to receive a bundled cable and then closed to grip the cable and hold it together. Preferably, the clip 48 is combined with one of the connectors 12 or 14 to form a single piece that is aesthetically pleasing in appearance.

Figure 14:
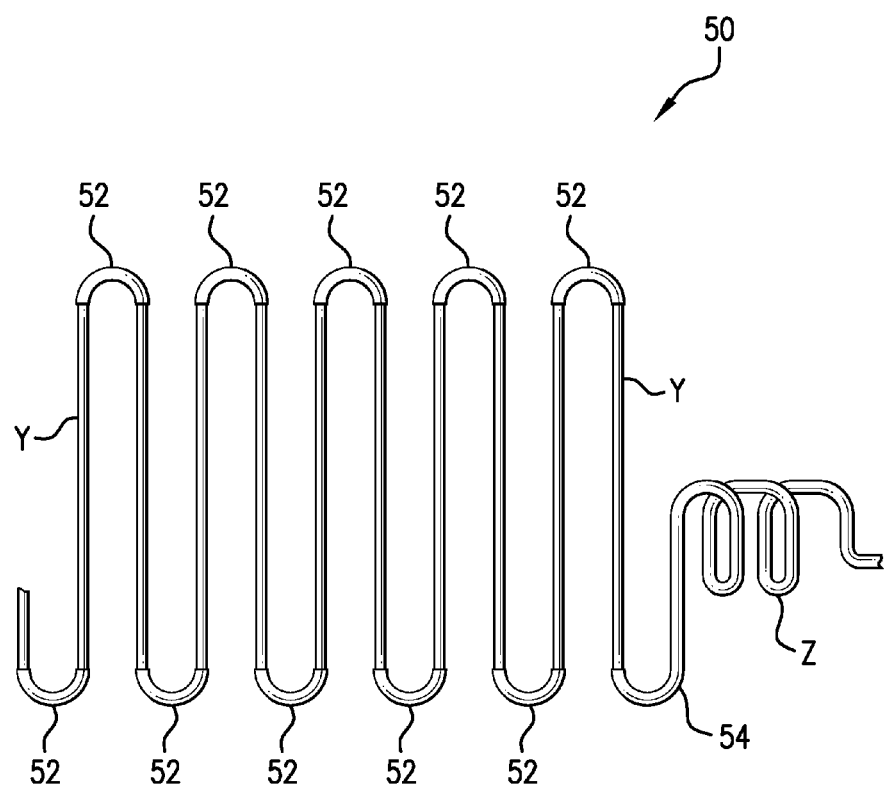
FIG. 14 is a view of another embodiment of the invention in which sleeves are used to create stiffer sections along the length of a cable.

Referring now to FIG. 14, there is illustrated yet another embodiment of the invention. In this embodiment, the cable 50 is formed into the familiar serpentine pattern of the other embodiments. However, instead of a variable stiffness cable, the cable 50 is of uniform stiffness and flexibility but is preformed similar to the embodiment of FIG. 6. Sleeves 52 are combined with the bends and a sleeve 54 is combined with and covers substantially all the spiral tail Z. Then the bends with sleeves 52 in place and the spiral tail Z with the sleeve 54 in place are then preformed. Because the sleeves 52 and 54 add thickness to the cable, they add stiffness and enhance the retention of the preformed bends and the spiral tail Z, thus creating an effect similar to that of a variable stiffness cable. The stiffness of the sleeves can be varied to change the stiffness of the cable bends and spiral tail. The transition between the stiff bends and the flexible sections are abrupt compared to the gradual and smooth transitions of a variable stiffness cable, which also has a much better appearance. Sleeves can be useful where the difference in stiffness is not great between the stiff bends and flexible sections, and sleeves are especially useful for very soft cables, such as those for earphones and the like, where the sleeves can be applied to the bends and spiral tail or to the spiral tail only, allowing the very soft cable to be wound around the fingers and then held in a bundle by the spiral tail. The use of sleeves and the use of a variable stiffness cable is also an advantage where it is desired to vary colors between the sections of the cable, and use of a sleeve with a low-friction surface over the spiral section helps in pulling out the loops when the cable is unbundled. If sleeves are used, they can be applied using a heat-shrink or other suitable means.

Another alternative to creating additional stiffness at the bends and the spiral tail Z in a cable of the type shown in FIG. 14 and described in the preceding paragraph, is to add stiffness to the bends and spiral tail Z by coating the bends and spiral tail with a polymeric coating of any suitable type. The polymeric coating can be applied by brushing or spraying the coating on the bends and spiral tail or the coating can be applied by a dipping process or by any other suitable method. In any event, the coating can be applied just to the bends or to the spiral tail only or to both the bends and spiral tail.

Figure 11:
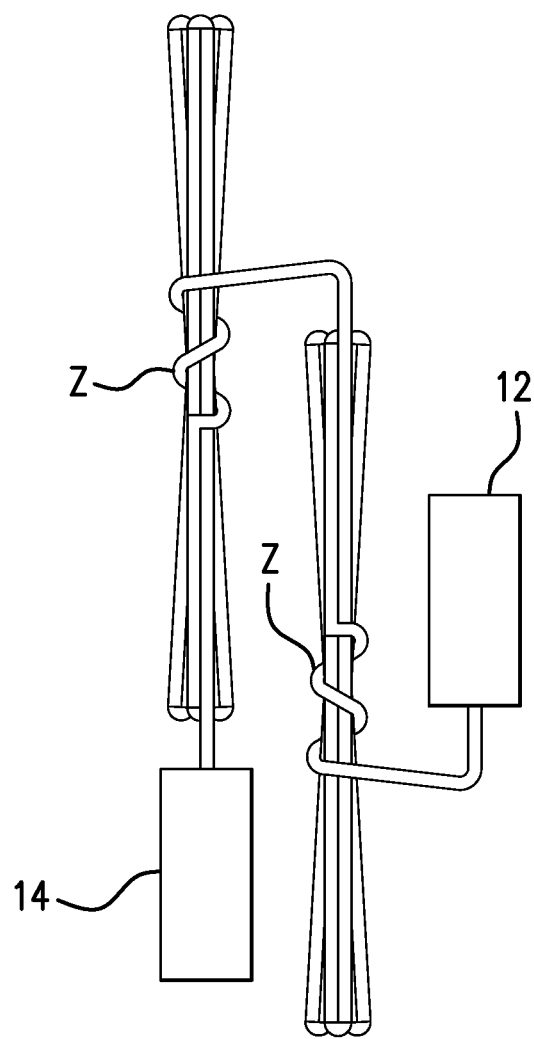
FIG. 11 is an illustration of multiple bundled cables using the principles of the invention.

In describing the foregoing various embodiments of the invention, a main advantage of the different cables of the invention is the ability to easily bundle the cables to reduce the required storage space, messy appearance, etc. Obviously, more than one spiral tail Z can be preformed in a single cable, allowing the user to make multiple bundles, as illustrated in FIG. 11, which shows two spiral tails Z in a single cable, which could be any of the cables 10, 20, 30, 40 or 50. Multiple bundling is especially useful in applications where a much longer cable is desired.

From the foregoing descriptions of the various embodiments of the invention, it will be seen that the invention offers many options for a variety of different cables and applications. Human beings have been using electrical cables for many generations, especially since the proliferation of electronic devices. Some individuals have developed their own ways to manage and organize them. One common way is to deliberately "loop" them together, by wrapping them around the fingers, around the hand and elbow, etc., and then tie them up with twist ties, pieces of ropes, or by the cable itself. Deliberately looping and tying a cable together requires considerably more time and effort than what it takes to bundle a cable together with preformed bends and restrain it with a spiral tail or hook, as is done with the cables of the invention. But, for some people, the old habit is hard to break. For such people, the invention offers the embodiments of FIG. 5 and FIG. 7. Using these options, people can still wrap the cables around their fingers or elbows. In addition, certain applications, such as earphone cables and some chargers, require very flexible cables. For these applications, the embodiment of FIG. 5 would work very well. As shown in FIG. 5 and previously described, this special option cable is made of two sections, a stiffer section for the spiral tail and a very flexible section for the rest of the cable. The stiffer spiral tail would retain the shape well and would offer an adequate force for the restraining action. The very flexible section offers the extreme flexibility required by these applications. To bundle this cable, you wrap the very flexible cable around the fingers to form the bundle and then wrap the bundle with a spiral tail to restrain it.

For applications that require stiffer cables, the option of FIG. 7 can be used. Although the lack of the characteristics of a variable-stiffness cable is a drawback in most applications, this cable is simpler and less costly to make. Although you probably cannot wrap this stiffer cable around the fingers, you still can wrap them around a hand and elbow.

All of the various embodiments of the invention employ the general concept of combining an easy-folding feature with an easy-restraining feature to create a folded and restrained cable arrangement. In all of the embodiments, it is important that both the cable and the restraining section have low coefficient of friction on their surfaces. The various versions of the invention allow the basic concept to be used for many different applications, some of which can accommodate the higher cost of a particular embodiment.

Having thus described the invention in connection with these various and preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

The invention claimed is:

1. A continuous and foldable cable for use with electrical and electronic devices, said cable comprising:
   a cable having a conductor and an outer jacket covering the conductor;
   the cable having a first end and a second end; and
   a preformed restrainer for the purpose of bundling and holding the cable when folded, the preformed restrainer consisting only of:
   a section of the cable between the first and second ends;
   a thermally formable portion of that section in which the outer jacket is stiffer than the outer jacket of the rest of the cable;
   the stiffer section being thermally and permanently preformed into a desired shape to create the preformed restrainer;
   wherein the preformed restrainer is capable of being wound and/or unwound around the folded cable to neatly bundle or unbundle the foldable cable and thereby prevent tangling of the foldable cable.

2. The cable of claim 1 in which there is a connector combined with the first end or the second end; and
   the preformed restrainer is combined with the end containing the connector for bundling the cable when folded.

3. The cable of claim 1 in which a connector is combined with both the first and second ends.

4. The cable of claim 2 in which the end not containing the connector is adapted to be connected to an electrical or electronic device.

5. The cable of claim 1 in which the preformed restrainer is a preformed spiral.

6. The cable of claim 1 in which the cable has two or more bends alternating with straight sections between the first end and the second end, the bends being more flexible than the straight sections.

7. The cable of claim 6 in which the flexibility of the cable gradually changes between the bends and the straight sections.

8. The cable of claim 7 in which the preformed restrainer is a spiral that permanently retains its shape.

9. The cable of claim 6 in which the preformed restrainer is a spiral that permanently retains its shape.

10. The cable of claim 9 in which sleeves are combined with and cover the bends and the preformed spiral.

11. The cable of claim 9 in which a sleeve is combined with and covers the preformed spiral only.

12. The cable of claim 5 in which the cable has two or more preformed bends alternating with straight sections between the first end and the second end, and the outer jackets over the bends are thermally preformed so that the bends permanently retain their shape.

13. The cable of claim 5 in which the cable is a variable-stiffness cable.

14. The cable of claim 5 in which a sleeve is combined with the preformed spiral and covers the spiral to add additional stiffness to the cable.

15. The cable of claim 12 in which there is one or more additional preformed spirals along the length of the cable in which the outer jackets covering the spirals are stiffer and are thermally preformed so that the cable can be bundled into two or more bundles.

16. The cable of claim 9 in which a polymeric coating is combined with the bends and the preformed spiral.

17. The cable of claim 9 in which a polymeric coating is combined with the preformed spiral only.

18. The cable of claim 5 in which a polymeric coating is combined with the preformed spiral.

19. A continuous and foldable cable for use with electrical and electronic devices, said cable comprising:
a cable having a conductor and an outer jacket covering the conductor;
the cable having a first end and a second end; and
a portion of the outer jacket between the first and second ends being thermally and permanently preformed into a desired shape to create a preformed restrainer having a W-shaped hook capable of bundling and holding the cable when folded, the W-shaped hook being formed by two preformed loops in approximately parallel planes joined by a third preformed loop in a plane approximately perpendicular to the planes of the two loops.

20. A continuous and foldable cable for use with electrical and electronic devices, said cable comprising:
a cable having a conductor and an outer jacket covering the conductor;
the cable having a first end and a second end;
a portion of the outer jacket between the first and second ends being thermally and permanently preformed into a desired shape to create a preformed restrainer capable of bundling and holding the cable when folded; and
the outer jacket of the cable has two or more thermally preformed bends spaced apart along the cable and alternating with straight sections of the cable, the bends being less flexible than the straight sections so as to retain their shape.

21. The cable of claim 20 in which the flexibility of the cable gradually changes between the bends and the straight sections.

22. The cable of claim 20 in which the cable is a variable stiffness cable.

23. The cable of claim 22 in which the preformed restrainer is a spiral.

24. A continuous and foldable cable for use with electrical and electronic devices, said cable comprising:
a cable having a conductor and an outer jacket covering the conductor;
the cable having a first end and a second end;
a portion of the outer jacket between the first and second ends being thermally and permanently preformed into a desired shape to create a preformed restrainer capable of bundling and holding the cable when folded, the preformed restrainer being a preformed spiral; and
the cable has two or more bends alternating with straight sections, the bends being less flexible than the straight sections so as to retain their shape, and the outer jackets over the bends are thermally preformed and of the same material as the spiral so that the bends permanently retain their shape.

25. The cable of claim 20 in which the outer jacket has a low-friction surface covering its exterior surface over substantially the entire length of the cable.

26. The cable of claim 25 in which the coefficient of friction of the low friction surface is lower than 0.3.

27. A continuous and foldable cable for use with electrical and electronic devices, said cable comprising:
a cable having a conductor and an outer jacket covering the conductor;
the cable having a first end and a second end;
the cable also having two or more preformed bends alternating with straight sections between the first end and the second end, and the outer jackets over the bends are thermally preformed so that the bends permanently retain their shape;
a portion of the outer jacket between the first and second ends being thermally and permanently preformed into a desired shape to create a preformed restrainer capable of bundling and holding the cable when folded, the preformed restrainer being a preformed spiral; and
the cable is a variable-stiffness cable and the preformed spiral and the preformed bends are of a stiffer material than the straight sections.

28. A continuous and foldable cable for use with electrical and electronic devices, said cable comprising:
a cable having a conductor and an outer jacket covering the conductor,
the material of the outer jacket of the cable being of uniform stiffness;
the cable having a first end and a second end; and
a preformed restrainer for the purpose of bundling and holding the cable when folded, the preformed restrainer consisting only of:
a section of the cable between the first and second ends;
a thermally formable sleeve that covers that section of the cable to add stiffness to that section; and
the sleeve and the section of the cable covered by the sleeve being stiffer than the rest of the cable and thermally and permanently preformed into a desired shape to create the preformed restrainer;
wherein the preformed restrainer is capable of being wound and/or unwound around the folded cable to neatly bundle or unbundle the foldable cable and thereby prevent tangling of the foldable cable.

29. The cable of claim 28 in which the preformed restrainer is a preformed spiral.

30. The cable of claim 29 in which the cable has two or more bends alternating with straight sections between the preformed spiral and the opposite end.

31. The cable of claim 28 in which the section of the cable not covered by the sleeve is thermally and permanently preformed into large loops of substantially the same size, the preformed loops being larger than the preformed restrainer.

32. The cable of claim 1 in which the section of the cable not forming the preformed restrainer is thermally and permanently preformed into large loops of substantially the same size, the preformed loops being larger than the preformed restrainer.

33. A continuous and foldable cable for use with electrical and electronic devices, said cable comprising:
a cable having a conductor and an outer jacket covering the conductor,
the cable having a first end and a second end; and
one or more preformed restrainers for the purpose of bundling and holding the cable when folded, the preformed restrainers consisting only of:
a first section of the cable between the first and second ends;
a thermally formable portion of the first section in which the outer jacket is stiffer than the outer jacket of the rest of the cable;
the stiffer portion of the first section being thermally and permanently preformed into a first preformed spiral to create a first preformed restrainer;
at least one additional section of the cable itself between the first and second ends;
a thermally formable portion of each additional section in which the outer jacket is stiffer than the rest of the cable except for the first section;

the stiffer portion of each additional section being thermally and permanently preformed into an additional preformed spiral to create additional preformed restrainers;

wherein each preformed restrainer is capable of being wound and/or unwound around the folded cable to neatly bundle or unbundle the foldable cable into one or more bundles and thereby prevent tangling of the foldable cable.

\* \* \* \* \*